UNITED STATES PATENT OFFICE.

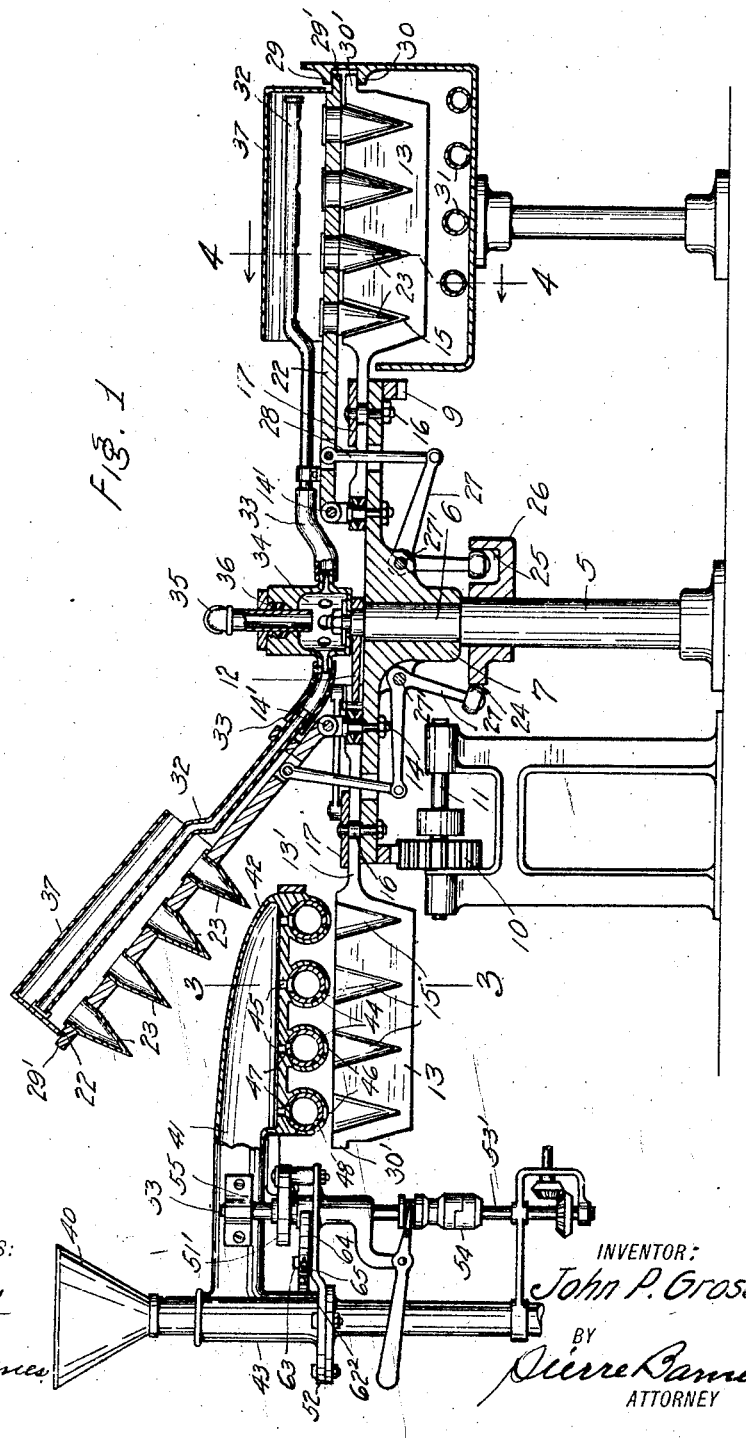

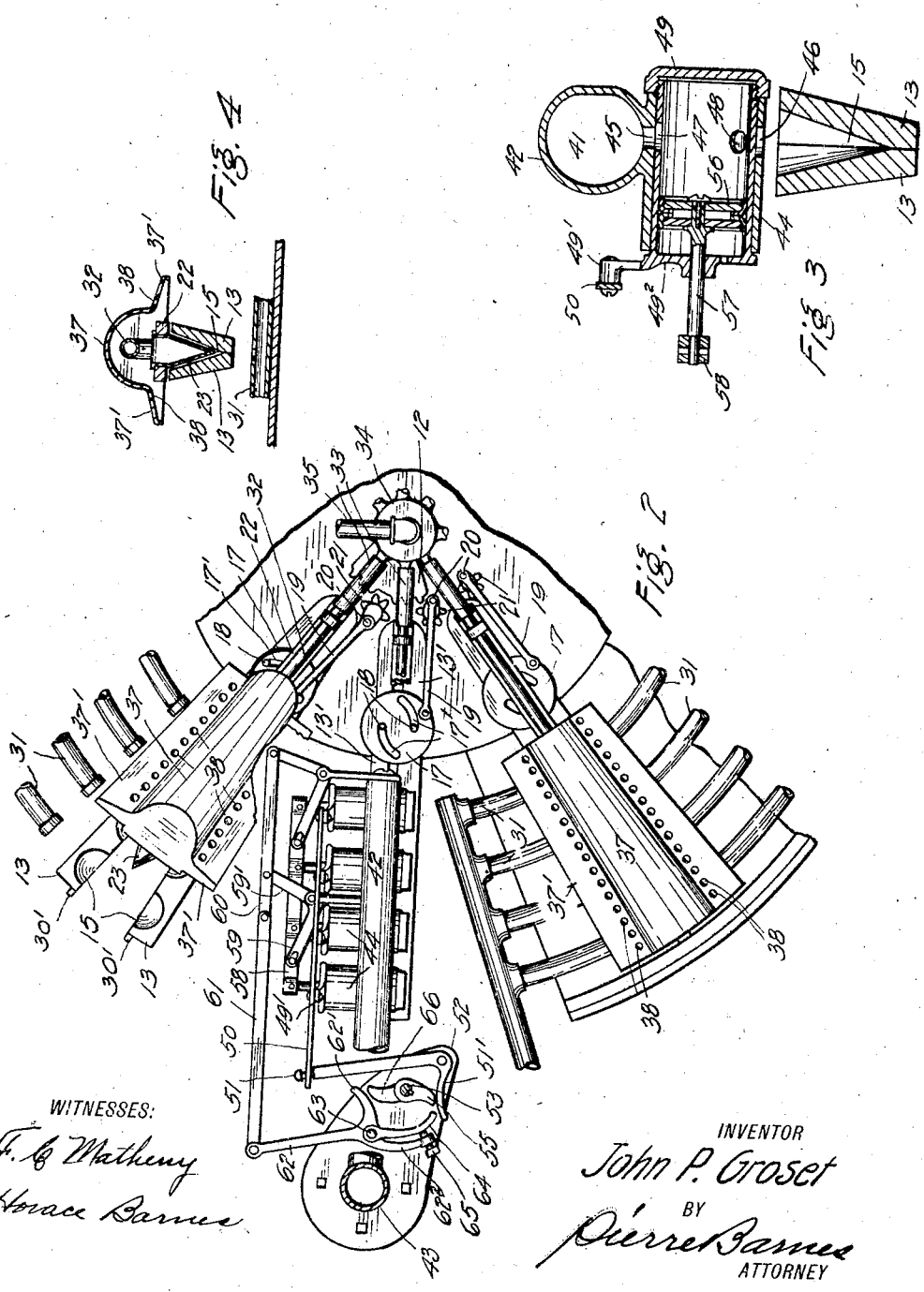

JOHN P. GROSET, OF BOTHELL, WASHINGTON.

ICE-CREAM-CONE-COOKING MACHINE.

1,079,597.

Specification of Letters Patent.  Patented Nov. 25, 1913.

Application filed February 26, 1912. Serial No. 680,131.

*To all whom it may concern:*

Be it known that I, JOHN P. GROSET, a citizen of the United States, residing at Bothell, in the county of King and State of Washington, have invented certain new and useful Improvements in Ice-Cream-Cone-Cooking Machines, of which the following is a specification.

This invention relates to cooking machines and has particular reference to machines of the type illustrated and described in my prior Patent No. 1,010,619, issued December 5, 1911.

The object of the present invention is the perfecting of such machines with a view to rendering more uniform the shaping and cooking of the cones which are produced thereby.

The improvements consist in the employment of heating elements with each group of cone molds, novel devices for feeding the batter to the various molds, and means whereby the complementary elements of the molds are positively maintained in suitable relative positions during the early portions of the cooking operations.

The invention further consists in the novel construction and combination of parts, as will be hereinafter described with reference to the accompanying drawings, in which—

Figure 1 is a transverse vertical section of a cooking machine illustrating the invention. Fig. 2 is a fragmentary plan view of the same. Figs. 3 and 4 are sectional views taken through 3—3 and 4—4 of Fig. 1.

As illustrated in said drawings, the reference numeral 5 represents an upright post provided near its upper end with a journal 6 for the hub 7 of a rotary carrier 8. Attached to the underside of the carrier is a circular rack 9 whereby it is continuously rotated during the operation of the machine through the agency of a toothed pinion 10 upon a power driven shaft 11. Above the carrier is a toothed sector gear 12 fixedly secured to said post. Upon the carrier is a plurality of mold-matrices each comprising a pair of members 13 provided with arms 13' which are hingedly connected to a stud 14 secured to the carrier. A matrix is provided with a series of conical recesses 15 with their axes disposed in the divisional plane between the matrix members. For each matrix is provided a pivot 16 for a disk 17 which is provided with cam slots 17' to receive pins 18 secured to the adjacent arms 13'. The disks 17 are each connected by a rod 19 with the crank pin 20 provided on a toothed pinion 21 mounted for rotary motion on the carrier. These pinions are each provided with an equal number of teeth to that provided on the sector gear 12 so that the latter will cause the complete rotation of each of the pinions as the same are revolubly carried by the sector teeth. As the pinions 21 are thus affected, the disks 17 are influenced through the medium of the rods 19 to effect the opening and closing of the respective mold matrices for the purpose of first discharging the cooked cones and then be restored into position to receive batter from the feeding devices. For coöperation with each of said matrices and constituting parts of the various molds are former-members 22 hingedly connected by pins 14', as shown, to the upper ends of the studs 14. Depending from each of the former members are hollow core elements 23 arranged to enter the recesses of the respective matrix members, as shown at the right hand side of Fig. 1. Said former members are successively tilted upwardly into the positions such as illustrated at the left side of the view, just before the associated matrices are opened, and in such elevated positions the former members are retained until after the respective matrices are supplied with batter whereupon the former members are lowered into their original positions. The raising and lowering of the former member is accomplished by means of cam tracks 24 and 25 provided on an attachment 26 of said post and through the agency of bell-crank levers 27 which are fulcrumed to lugs 27' provided on the carrier hub 7. One of the arms of a lever is provided with a roller which engages said cam track while the other arm is connected to the former by a lifting-rod 28. Supplementary to the cam track 25 which is employed to lower the former members, I use a pair of trackways, 29 and 30, to engage lugs 29' and 30' provided respectively upon the former member and the matrix to positively hold these parts in their proper relative positions to overcome the separation of the same due to the expansion of the material in the early stages of cooking, through the generation of steam or otherwise. Below the molds is a plurality of perforated pipes 31 which serve as gas-burners.

Above each of the former members is a gas burner comprising a pipe 32 fixedly secured thereto and having at its underside a series of holes arranged to direct flames into the various subjacent cores 23. The pipes 32 are each connected by a hose 33, or an equivalent, with outlet openings provided in the peripheral wall of a gas reservoir 34 which is connected with the carrier for rotation therewith.

35 represents a gas supply pipe extending through a stuffing box 36 into said reservoir.

Secured to each former member is a sheet metal hood consisting of a substantially semi-cylindrical central part 37 affording a cover for a former member, and with two downwardly inclined wings 37' extending from the lower edges of the part 37 at opposite sides. In proximity to the hood part 37 each of the wings is provided with apertures 38 which serve as outlet openings for the hot combustion gases derived from the burners 31. By such devices the matrices of the molds are subjected to a relatively high degree of heat by reason of the currents of hot air and gases being directed close to the same in flowing to the apertures to escape therethrough.

The batter feeding devices for the machine will now be described. The batter is supplied to a hopper 40, Fig. 1, whence it flows into a chamber 41 provided in a branch 42 of the hopper pedestal 43. Said branch extends radially of the machine into the space between the matrix and former members when the former member is in the elevated position in which it is represented at the left of Fig. 1. Depending from said arm are cylindrical vessels 44 arranged with their axes parallel and at right angles to a plane radial of the machine. These vessels are provided with inlet ports 45 communicating with the chamber 41 above, and with discharge ports 46 below, for the respective recesses of the mold matrices. Fitted for oscillatory motion within each of the vessels 44 is a circular hollow valve 49 having ports 47 and 48 which are alternately brought into register with the aforesaid inlet and outlet ports 45 and 46, respectively. To accomplish such movements, the valves are provided with crank arms 49' connected by a drag bar 50 which, in turn, is connected to the arm 51 of a bell-crank lever (see Fig. 2) which is pivotally supported upon a bracket 52 secured to the pedestal 43. Extending through this bracket is an upright shaft comprised of two axially alined members 53 and 53', whereof the lower one is driven by suitable power transmission devices, and the other shaft member is operatively connected thereto by a clutch-coupling 54. Secured to the shaft 53 is a cam toe 55 which successively engages the arms 51 and 51' of the above mentioned lever to vibrate the same and thus cause the drag-bar which is connected therewith to effect the referred to oscillatory movements of the valves. The means for operating the latter is adjusted so that the ports 48 of the valves will first register with the ports 46 of the vessels 44 when the mold matrices are successively below the same.

To discharge the batter I utilize in each of the valves a piston 56, see Fig. 3, having a rod 57 extending through the valve end $49^2$ and connected to a cross head 58 which is also connected to arms 59 of bell-cranks whose other arms 59' are connected to a drag bar 60. 61 is a link connecting this drag bar with a lever 62 pivotally connected by a pin 63 to the bracket 52. The lever 62 is provided with arms 62' and $62^2$ disposed as illustrated in Fig. 2 and an arm 64 is pivotally connected to the pin 63. The arm 64 is, in effect, a part of the lever 62 and is adjustably held in operative position through the medium of a screw 65 extending through a threaded hole in the lever arm $62^2$. A cam toe 66 is carried on the shaft 53 and is arranged to alternately engage the arms 64 and 62' to afford vibratory movements to the lever 62 whereby the pistons 56 are moved toward and from the ports of the various valves. When the toe 66 engages the arm 64 the pistons are impelled away from the ports to induce a flow of the batter to within the valves, but when the other arm 62' is thus engaged contrary motion is imparted to pistons resulting in the positive ejection of the batter from the valves through the then coinciding ports 46 and 48 to supply the molds with batter. By adjusting the screw 65 the amount of feed is regulated to correspond with the travel of the pistons.

The operation of the invention will, it is thought, be understood from the foregoing description.

What I claim as new, is—

1. In an ice cream cone cooking apparatus, a vertically movable former, heating cores upon said former, a hood over said former, projecting inclined wings upon said hood extending below the plane of the open tops of said cores and provided with rows of outlet apertures adjacent to the hood.

2. An ice cream cone cooking apparatus comprising a standard, a former and a gas reservoir revolubly-mounted upon said standard, hollow cores upon said former, a gas burner pipe upon said former provided with openings adapted for directing flame separately into each of said cores, a hose connection between said pipe and reservoir, a stationary gas entrance pipe entering said gas reservoir, a sheet metal hood mounted over said former, downwardly-inclined wings extending from the lower edges of the hood and provided with rows of outlet apertures adjacent to the hood and the said former member being readily movable vertically.

Signed at Seattle, Wash., this 17th day of February, 1912.

JOHN P. GROSET.

Witnesses:
 HORACE BARNES,
 E. PETERSON.